United States Patent
Iyer et al.

(10) Patent No.: US 9,602,284 B1
(45) Date of Patent: Mar. 21, 2017

(54) SECURE OFFLINE AUTHENTICATION

(71) Applicant: Bank of America Corporation, Charlotte, NC (US)

(72) Inventors: Shankar Ramasubramanian Iyer, East Windsor, NJ (US); Maria Auxilia Dominique, Kendall Park, NJ (US); Ankit A. Khandelwal, Lawrenceville, NJ (US); Dhrumit Desai, Lawrenceville, NJ (US); Navanith R. Keerthi, Lawrenceville, NJ (US); Lavanya Tangutur, Bridgewater, NJ (US)

(73) Assignee: Bank of America Corporation, Charlotte, NC (US)

( * ) Notice: Subject to any disclaimer, the term of this patent is extended or adjusted under 35 U.S.C. 154(b) by 5 days.

(21) Appl. No.: 14/852,204

(22) Filed: Sep. 11, 2015

(51) Int. Cl.
*H04L 9/32* (2006.01)
*H04L 9/08* (2006.01)
*H04L 29/06* (2006.01)

(52) U.S. Cl.
CPC ............ *H04L 9/321* (2013.01); *H04L 9/0822* (2013.01); *H04L 9/0866* (2013.01); *H04L 9/0869* (2013.01); *H04L 9/3226* (2013.01); *H04L 9/3236* (2013.01); *H04L 63/083* (2013.01); *H04L 63/0428* (2013.01)

(58) Field of Classification Search
CPC .. H04L 63/0428; H04L 9/0822; H04L 9/0869
See application file for complete search history.

(56) References Cited

U.S. PATENT DOCUMENTS

| | | | | |
|---|---|---|---|---|
| 7,913,085 | B2* | 3/2011 | Fascenda | H04L 63/0853 380/37 |
| 8,862,900 | B2* | 10/2014 | Chen | H04L 9/3228 713/190 |
| 9,294,267 | B2* | 3/2016 | Kamath | H04L 9/0822 |
| 9,330,245 | B2* | 5/2016 | Maron | G06F 21/31 |
| 2006/0112283 | A1* | 5/2006 | Eldridge | G06F 21/33 713/193 |
| 2007/0234063 | A1* | 10/2007 | Ueda | G06F 21/31 713/183 |
| 2011/0099616 | A1* | 4/2011 | Mazur | H04L 63/0846 726/7 |
| 2012/0204245 | A1* | 8/2012 | Ting | G06F 21/35 726/6 |
| 2013/0133086 | A1* | 5/2013 | Liberman | G09C 5/00 726/28 |
| 2013/0219180 | A1* | 8/2013 | Saino | G06F 21/42 713/171 |

(Continued)

*Primary Examiner* — James Turchen
(74) *Attorney, Agent, or Firm* — Michael A. Springs (57) ABSTRACT

A user workstation stores a vendor identifier and encrypted data comprising a first string of randomized data, a second string of randomized data, and encrypted text, the encrypted text further comprising a first security answer. The user workstation receives credentials information and a second security answer. The user workstation then generates an encryption key. Further, the user workstation uses the encryption key to decrypt the encrypted text and extract the first security answer. Then, the user workstation compares the second security answer with the first security answer and authenticates the second username if the second security answer is the same as the first security answer.

20 Claims, 4 Drawing Sheets

(56) References Cited

U.S. PATENT DOCUMENTS

| | | | |
|---|---|---|---|
| 2014/0149742 A1* | 5/2014 | Yau | H04L 63/083 |
| | | | 713/159 |
| 2015/0058191 A1* | 2/2015 | Khan | G06Q 20/42 |
| | | | 705/35 |
| 2015/0339664 A1* | 11/2015 | Wong | H04L 9/3234 |
| | | | 705/71 |

* cited by examiner

SECURE OFFLINE AUTHENTICATION

TECHNICAL FIELD OF THE INVENTION

This invention relates generally to user authentication, and more specifically to secure offline authentication.

BACKGROUND

It is often necessary for users, such as employees of a company, to use electronic devices in remote locations where network connectivity is not available. For example, workers may need to travel to remote facilities to assess oil rigs or other industrial operations. Users may need access to sensitive information on their user devices when they are at such remote locations. This sensitive information needs to be stored securely so that only authorized users are able to access it. However, it may not be possible to authenticate such users via a network connection because network connectivity is not available in these remote areas. Thus, an offline authentication mechanism is needed for authenticating users and decrypting securely stored information.

SUMMARY

According to embodiments of the present disclosure a user workstation operable to store a vendor identifier and encrypted data comprising a first string of randomized data, a second string of randomized data, and encrypted text, the encrypted text further comprising a hashed first security answer is disclosed. The user workstation is operable to receive credentials information and a second security answer, apply a hash function to the credentials information, and apply a hash function to the second security answer. The user workstation may then generate an encryption key using the hashed credentials information, vendor identifier, and the first string of randomized data. Further, the user workstation may use the encryption key and the second string of randomized data to decrypt the encrypted text and extract the hashed first security answer. Then, the user workstation may compare the hashed second security answer with the hashed first security answer and authenticate the second username if the hashed second security answer is the same as the hashed first security answer.

The present embodiment presents several technical advantages. First, in the present embodiment, a user workstation is able to access secure data stored on the user workstation even when the user workstation is not connected to a network. Second, the present embodiment provides multiple layers of security for authenticating a user before that user is able to access secure information. These encryption layers ensure that only the authorized user using an authorized user workstation is able to access the information stored on the user workstation. Additionally, in the present embodiment, a user enrolls for offline authentication through an enrollment module which ensures that users who do not have access to the enrollment module cannot access the secure data stored on user workstation Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE DRAWINGS

Figure 1:
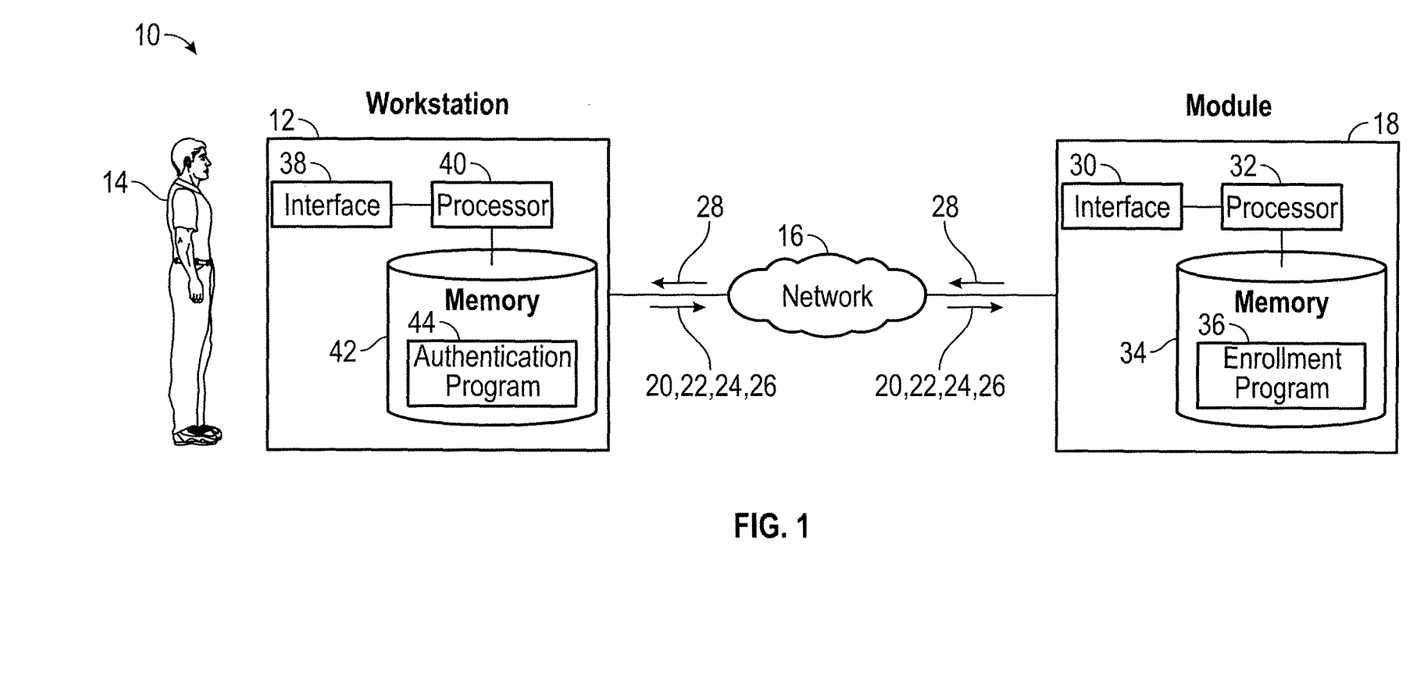
FIG. 1 illustrates an example system for encrypting data on a user workstation and enrolling the user workstation for secure offline authentication.

FIG. 1 illustrates a system 10 for encrypting data on a user workstation 12 and enrolling the user workstation 12 for secure offline authentication. Secure offline authentication may involve, for example, authenticating that a user 14 seeking access to data stored on a user workstation 12 is authorized to access that data even if the user workstation 12 is not connected to a network 16. Such authentication prevents unauthorized users and unauthorized devices from gaining access to secure data.

In the present embodiment, user workstation 12 and user 14 are first enrolled for offline authentication while user workstation 12 is connected to enrollment module 18 via network 16. Once user workstation 12 and user 14 are enrolled for secure offline authentication, user workstation 12 and user 14 may access secure data stored locally on user workstation 12 even when user workstation 12 is not connected to network 16 and/or enrollment module 18.

In FIG. 1, user workstation 12 is connected, via network 16, to enrollment module 18. To enroll for offline authentication, user 14 first enters credential information 20, including, for example, a username and a password, into user workstation 12. User 14 also selects a security question 24 and provides a security answer 26. User workstation 12 transmits this credentials information 20, a vendor identifier 22 (which may identify one or more specific user workstations 12), security question 24, and security answer 26 to enrollment module 18. Enrollment module 18 then uses the received information to generate encrypted data 28. Enrollment module 18 sends the encrypted data 28 to workstation 12. Encrypted data 28 is then stored locally at workstation 12. At this point, user workstation 12 and user 14 are enrolled for secure offline authentication.

As discussed in greater detail with respect to FIG. 3 and FIG. 4 below, once user workstation 12 and user 14 are enrolled for secure offline authentication, a user 14 using user workstation 12 may access secure data stored on user workstation 12 even if user workstation 12 is not connected to enrollment module 18. To access the secure data, user 14 may enter credential information 20 as well as security answer 26 into user workstation 12 to be authenticated locally at user workstation 12.

The present embodiment presents several technical advantages. First, in the present embodiment, a user workstation 12 is able to access secure data stored on the user workstation 12 even when the user workstation 12 is not connected to a network 16. Second, the present embodiment provides multiple layers of security for authenticating a user 14 before user 14 is able to access secure information. For example, because the encryption and decryption processes of the present embodiment uses credential information 20 and security answer 26 to generate encrypted data 28, only a user 14 with access to credential information 20 is able to decrypt encrypted data 28 to access the secure data stored on user workstation 12. Next, because the encryption and decryption processes of the present embodiment use a vendor identifier 22 that is unique to one or more particular user workstation 12, only users 14 using an authorized user workstation 12 are able to access the secure data. Additionally, in the present embodiment, a user 14 enrolls for offline authentication through the enrollment module 18 which ensures that users 14 who do not have access to enrollment module 18 cannot access the secure data stored on user workstation 12. This allows users 14 to store highly valuable and sensitive data locally on their workstations 12 with security.

As illustrated in FIG. 1, in system 10, workstation 12 enables one or more users 14 to interact with enrollment module 18 over network 16. Workstation 12 may include one or more laptops, personal computers, monitors, display devices, handheld devices, smartphones, servers, user input devices, or other suitable components for enabling user input. Workstation 12 may be a part of an enterprise or could remotely access an enterprise.

Network 16 represents any suitable network operable to facilitate communication between the components of system 10. Network 16 may include any interconnecting system capable of transmitting audio, video, signals, data, messages, or any combination of the preceding. Network 16 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Enrollment module 18 represents any suitable components that facilitates secure offline authentication. Enrollment module 18 may include a network server, remote server, mainframe, host computer, workstation, web server, personal computer, file server, or any other suitable device operable to communicate with other devices and process data. In some embodiments, enrollment module 18 may execute any suitable operating system such as IBM's zSeries/Operating System (z/OS), MS-DOS, PC-DOS, MAC-OS, WINDOWS, UNIX, OpenVMS, Linux, or any other appropriate operating systems, including future operating systems.

The functions of enrollment module 18 may be performed by any suitable combination of one or more servers or other components at one or more locations. In the embodiment where the modules are servers, the servers may be public or private servers, and each server may be a virtual or physical server. The server may include one or more servers at the same or at remote locations. Enrollment module 18 may also include any suitable component that functions as a server. In some embodiments, workstation 12 may be integrated with enrollment module 18 or they may operate as part of the same device or devices.

In the illustrated embodiment, enrollment module 18 includes module interface 30, module processor 32, and module memory 34, which comprises enrollment program 36. Similarly, user workstation 12 has workstation interface 38, workstation processor 40, workstation memory 42, and authentication program 44.

Interfaces 30 and 38 represent any suitable devices operable to receive information from network 16, transmit information through network 16, perform suitable processing of the information, communicate to other devices, or any combination thereof. For example, module interface 30 may receive credential information 20, vendor identifier 22, security question 24, and security answer 26 via network 16. Module interface 30 may also send encrypted data 28 over network 16. Similarly, workstation interface 38 may send credential information 20, vendor identifier 22, security question 24, and security answer 26 over network 16. And workstation interface 38 may receive encrypted data 28 over network 16. Interfaces 30 and 38 may represent any port or connection, real or virtual, including any suitable hardware and/or software, including protocol conversion and data processing capabilities, to communicate through a LAN, WAN, or other communication system that allows enrollment module 18 and user workstation 12, respectively, to exchange information with each other, network 16, or any other components of system 10.

Module processor 32 communicatively couples module interface 30 and module memory 34 and controls the operation of enrollment module 18. Similarly, workstation processor 40 communicatively couples workstation interface 38 and workstation memory 42 and controls the operation of workstation 12. Processors 32 and 40 include any hardware and software that operates to control and process information. Processors 32 and 40 may execute computer-executable program instructions stored in memory 34 and 42 respectively. Each of processors 32 and 40 may include, but are not limited to, a microprocessor, an application specific integrated circuit (ASIC), and or state machines. Each of processors 32 and 40 may comprise one or more processing devices.

Module memory 34 stores, either permanently or temporarily, data, operational software, other information for module processor 32, other components of enrollment module 18, or other components of system 10. Similarly, workstation memory 42 stores, either permanently or temporarily, data, operational software, other information for workstation processor 40, other components of workstation 12, or other components of system 10. Memory 34 and 42 include any one or a combination of volatile or non-volatile local or remote devices suitable for storing information. For example, memory 34 and 42 may include RAM, ROM, flash memory, magnetic storage devices, optical storage devices, network storage devices, cloud storage devices, solid state devices, or any other suitable information storage device or a combination of these devices.

Memory 34 and 42 may store information in one or more databases, file systems, tree structures, any other suitable storage system, or any combination thereof. Furthermore, different information stored in memory 34 and 42 may use any of these storage systems. Any information stored in memory 34 and 42 may be encrypted or unencrypted, compressed or uncompressed, and static or editable. Although illustrated as including particular modules, module memory 34 may include any suitable information for use in the operation of enrollment module 18. For example, module memory 34 may store credential information 20. Similarly, workstation memory 42 may include any suitable information for use in the operation of workstation 12. For example, workstation memory 42 may store vendor identifier 22. Vendor identifier 22 may be a unique identifier for one or more particular user workstations 12. Workstation memory 42 may also store any sensitive or confidential information that a user 14 may need to access when workstation 12 is offline.

In the illustrated embodiment, module memory 34 includes enrollment program 36. Module processor 32 may implement enrollment program 36 to facilitate the enrollment of user workstation 12 and user 14 in the manner described below with respect to FIG. 2. Similarly, workstation memory 42 may store authentication program 44. Workstation processor 40 may implement authentication program 44 to facilitate the offline authentication of user workstation 12 and user 14 in the manner described below with respect to FIG. 4.

Figure 2:
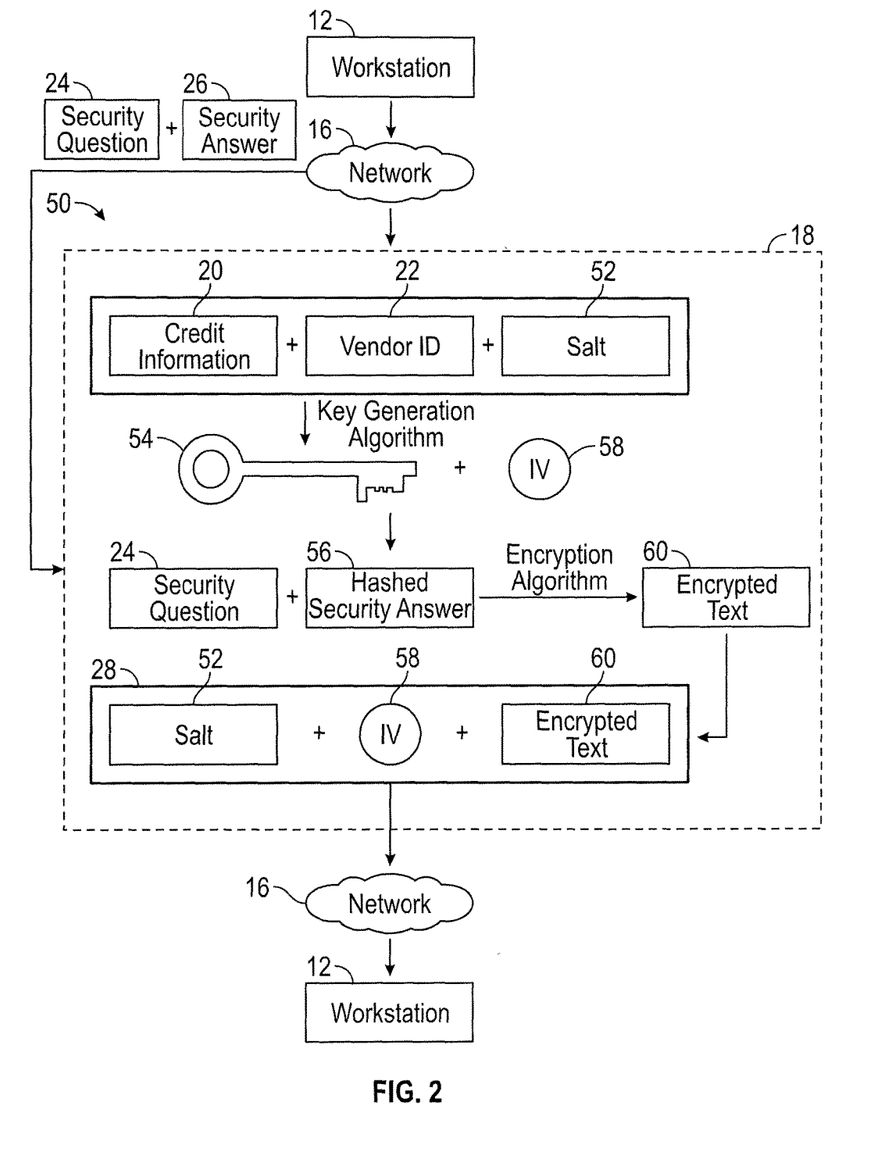
FIG. 2 illustrates an example process for encrypting data on a user workstation and enrolling the user workstation for secure offline authentication.

FIG. 2 illustrates an example enrollment process 50 for encrypting data on user workstation 12 and enrolling user workstation 12 for secure offline authentication. In one embodiment, enrollment process 50 may be executed by enrollment program 36 on enrollment module 18. During enrollment process 50, user workstation 12 is connected to enrollment module 18 via network 16.

As illustrated in FIG. 2, enrollment process 50 starts when enrollment module 18 receives credential information 20 such as a username and a password, and vendor identifier 22 from user workstation 12. In one embodiment, enrollment module 18 authenticates credential information 20 and checks whether credential information 20 is already enrolled for offline authentication. If credential information 20 is already registered for offline authentication, enrollment process 50 may end.

In some embodiments, enrollment module 18 applies a hash function to the received credential information 20. A hash function may be any function that can be used to map digital data of arbitrary size to digital data of a fixed size. In various embodiments, enrollment module 18 may apply the hash function to some or all of credential information 20. Enrollment module 18 may group the hashed credential information 20 with the vendor identifier 22 to generate a seed.

Credential information 20 and vendor identifier 22 may then be coupled to salt 52 which comprises randomized data. Next, enrollment module 18 may apply a key derivation function to the combination of credential information 20, vendor identifier 22, and salt 52 to generate encryption key 54.

In various embodiments, enrollment module 18 may apply various different key derivation functions to generate encryption key 54. A key derivation function may be any function that can derive one or more keys from an input using a pseudo-random function. For example, enrollment module 18 may apply PBKDF2, bcrypt, scrypt or any other suitable key derivation functions to generate encryption key 54.

Next, user workstation 12 may present user 14 with one or more security questions 24. User 14 may select a security question 24 and provide a security answer 26. In some embodiments, enrollment module 18 may apply a hash function to the security answer 26 to generate a hashed security answer 56. Enrollment module 18 couples hashed security answer 56 with the security question 24 that the user 14 selected. Next, enrollment module 18 may generate an initialization vector 58. Initialization vector 58 may comprise randomized data. Enrollment module 18 may then combine the security question 24, hashed security answer 56, encryption key 54, and initialization vector 58 and input them into an encryption algorithm to generate encrypted text 60.

In various embodiments, enrollment module 18 may use different encryption algorithms to generate encrypted text 60. For example, enrollment module 18 may use the AES 256, DES, or any other suitable encryption algorithm.

Next, enrollment module 18 may group salt 52, initialization vector 58, and encrypted text 60 to generate encrypted data 28. Encrypted data 28 is then sent from enrollment module 18 via network 16 to workstation 12. Workstation 12 stores encrypted data 28 locally in workstation memory 42. At this point, user workstation 12 is enrolled for secure offline authentication and enrollment process 50 may end.

In some embodiments, workstation 12 may also retrieve additional secure data from module memory 34 and store it in workstation memory 42 before, after, or during enrollment process 50. User workstation 12 and user 14 may need to be authenticated to access this secure data.

Figure 3:
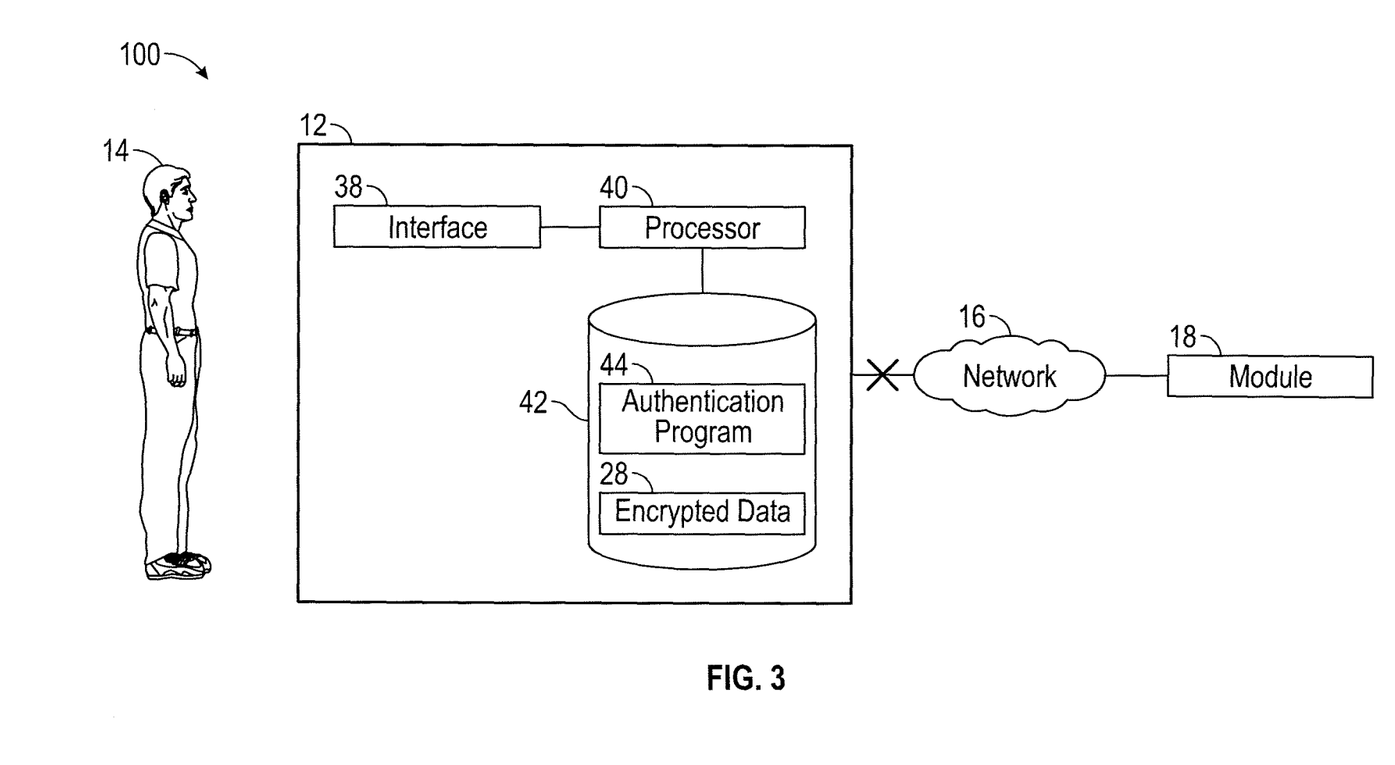
FIG. 3 illustrates an example system for authenticating a user and decrypting data on a user workstation that is offline.

FIG. 3 illustrates an example system 100 for authenticating a user 14 and decrypting encrypted data 28 that is stored locally on user workstation 12. System 100 may be used, for example, to authenticate a user 14 and decrypt the encrypted data 28 so that the user 14 may access secure data that is stored on workstation memory 42. The components of FIG. 3 are substantially similar to the components of FIG. 1 discussed above. However, unlike in FIG. 1, in FIG. 3 user workstation 12 is no longer connected to enrollment module 18 via network 16. As such, user workstation 12 and user 14 cannot be authenticated by enrollment module 18 and are instead authenticated locally at user workstation 12.

Figure 4:
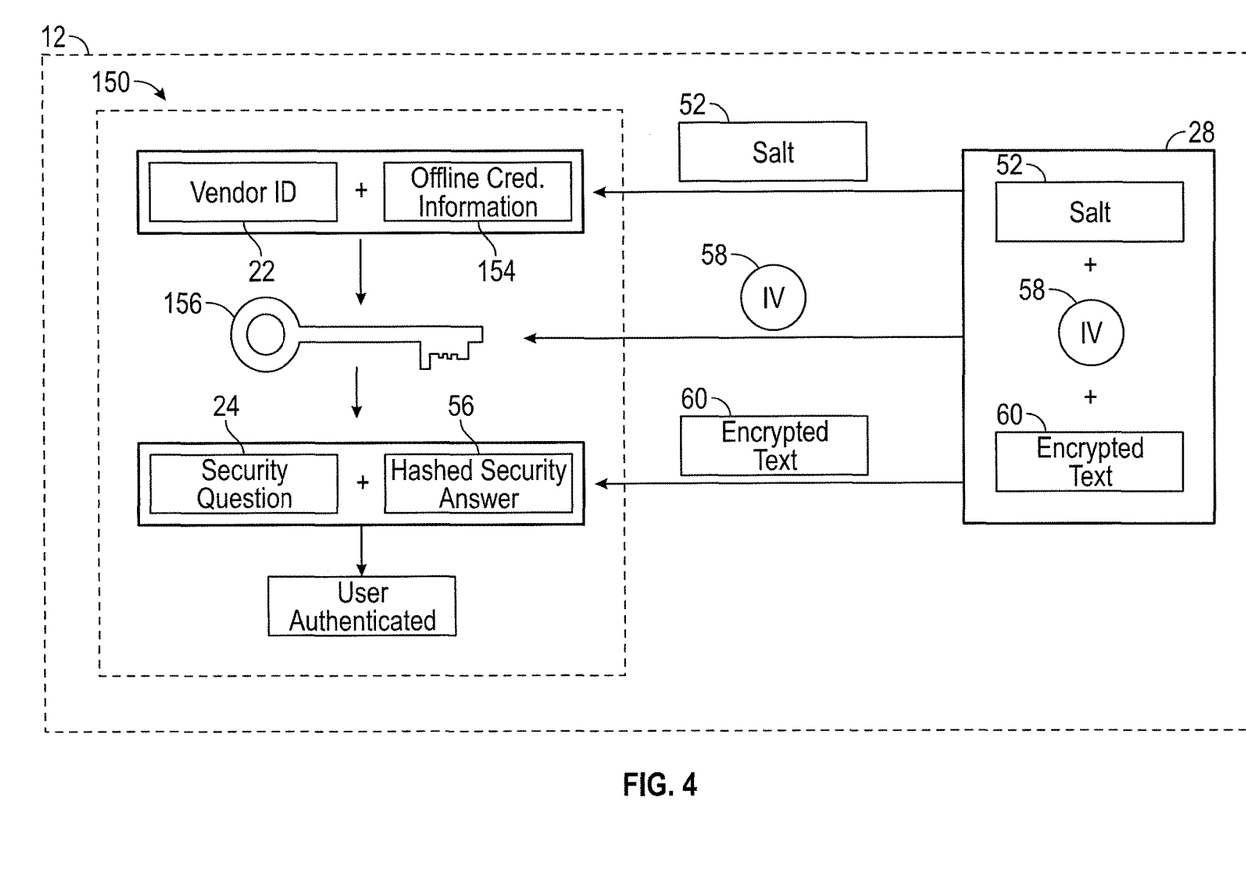
FIG. 4 illustrates an example process for authenticating a user and decrypting data on a user workstation that is offline.

FIG. 4 illustrates an example authenticating process 150 for authenticating a user 14 and decrypting data on a user workstation 12 while user workstation 12 is disconnected from module 18. In one embodiment, authenticating process 150 may be executed by authentication program 44 on user workstation 12.

Authenticating process 150 may authenticate user workstation 12 after user workstation 12 has been enrolled for secure offline authentication through, for example, enrollment process 50 discussed above with respect to FIG. 2. During enrollment process 50, workstation 12 receives encrypted data 28 and stores it locally in workstation memory 42.

Authenticating process 150 starts when user workstation 12 receives offline credentials information 154 such as a username and password. In one embodiment, a user 14 may enter offline credentials information 154 into user workstation 12. User workstation 12 then couples the offline credentials information 154 with vendor identifier 22.

In some embodiments, user workstation 12 may hash offline credentials information 154. Depending upon whether enrollment module 18 hashed some, all, or none of credentials information 20 in FIG. 2, in various embodiments, user workstation 12 may hash some, all, or none of offline credentials information 154 as well.

User workstation 12 then retrieves the encrypted data 28 from workstation memory 42 and separates it into the salt 52, the initialization vector 58, and the encrypted text 60. User workstation 12 then applies a key generation algorithm to offline credentials information 154, salt 52, and vendor identifier 22 to generate an offline encryption key 156. User workstation 12 may apply any suitable key generation algorithm to generate offline encryption key 156 including applying the same key generation algorithm used to generate encryption key 54 above.

Next, user workstation 12 couples offline encryption key 156 with initialization vector 58 and tries to decrypt encrypted text 60 using the combination of offline encryption key 156 and initialization vector 58.

If user workstation 12 is unable to decrypt encrypted text 60, user 14 may be allowed to reenter offline credentials information 154. In some embodiments, user 14 may be notified that the entered offline credentials information 154 is incorrect. In some embodiments, user 14 may only be allowed to enter offline credentials information 154 a predetermined number of times before user workstation 12 locks out user 14.

If user workstation 12 is able to decrypt encrypted text 60, user workstation 12 retrieves the security question 24 and hashed security answer 56 from the decrypted text. User workstation 12 presents user 14 with security question 24 and prompts user 14 for an answer. User workstation 12 then hashes the received answer and compares it with the hashed security answer 56. If the hashed received answer is different from the hashed security answer 56, user workstation 12 may allow user 14 to enter the correct answer. In some embodiments, user 14 may only be allowed to enter the correct answer a predetermined number of times before user workstation 12 locks out the user 14. If the hashed received answer and the hashed security answer 56 are the same, user 14 is authenticated and may be allowed access to the secure data in workstation memory 42.

Modifications, additions, or omissions may be made to the systems, apparatuses, and processes described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants wish to note that they do not intend any of the appended claims to invoke 35 U.S.C. §112(f) as it exists on the date of filing hereof unless the words "means for" or "step for" are explicitly used in the particular claim.

What is claimed is:

1. An offline authentication system comprising:
    a server configured to:
        receive first credentials information and a vendor identifier;
        apply a hash function to the first credentials information;
        generate a first encryption key by using the vendor identifier, the hashed first credentials information, and a first string of randomized data;
        receive a first security answer and apply a hash function to the first security answer;
        generate encrypted text using the hashed first security answer, the first encryption key, and a second string of randomized data;
        combine the first string of randomized data, the second string of randomized data, and the encrypted text to generate encrypted data;
        send the encrypted data to a user workstation associated with the vendor identifier;
    the user workstation configured to receive and store encrypted data when coupled to the server;
    the user workstation, when decoupled from the server, configured to:
        receive second credentials information;
        apply a hash function to the second credentials information;
        receive a second security answer and apply a hash function to the second security answer;
        generate a second encryption key using the hashed second credentials information, the vendor identifier, and the first string of randomized data;
        use the second encryption key and the second string of randomized data to decrypt the encrypted text to extract the hashed first security answer;
        compare the hashed second security answer with the hashed first security answer; and
        authenticate the second credentials information if the hashed second security answer is the same as the hashed first security answer.

2. The system of claim 1, wherein the first encryption key is generated by applying a key derivation function on the vendor identifier, the hashed first credentials information, and the first string of randomized data.

3. The system of claim 2, wherein the key derivation function is the PBKDF2 key generation function.

4. The system of claim 1, wherein the first credentials information comprises a first username and a first password and the second credentials information comprises a second username and a second password.

5. The system of claim 4, wherein the second username and second password are rejected if the encrypted text cannot be decrypted using the second encryption key.

6. The system of claim 1, wherein the encrypted text is generated by using the AES 256 encryption algorithm.

7. The system of claim 1, wherein the vendor identifier identifies one or more user workstation.

8. A user workstation, comprising:
    a processor; and
    a memory storing executable instructions that when executed by the processor cause the workstation to:
        store a vendor identifier and encrypted data comprising a first string of randomized data, a second string of randomized data, and encrypted text, the encrypted text further comprising a hashed first security answer;
        receive credentials information and a second security answer;
        apply a hash function to the credentials information and to the second security answer;
        retrieve the first string of randomized data, the second string of randomized data, and the encrypted text from the encrypted data;
        generate an encryption key using the hashed credentials information, vendor identifier, and the first string of randomized data;
        use the encryption key and the second string of randomized data to decrypt the encrypted text and extract the hashed first security answer;
        compare the hashed first security answer with the hashed second security answer; and
        authenticate the credentials information if the hashed second security answer is the same as the hashed first security answer.

9. The user workstation of claim 8, wherein the encryption key is generated by applying a key derivation function on the vendor identifier, the hashed credentials information, and the first string of randomized data.

10. The user workstation of claim 9, wherein the key derivation function is the PBKDF2 key generation function.

11. The user workstation of claim 8, wherein the credentials information comprises a username and a password.

12. The user workstation of claim 11, wherein the username and password are rejected if the encrypted text cannot be decrypted using the encryption key.

13. The user workstation of claim 8, wherein the encrypted text is generated by using the AES 256 encryption algorithm.

14. The user workstation of claim 8, wherein the vendor identifier identifies one or more user workstations.

15. A method of enrolling a user for offline authentication comprising:
 receiving first credentials information, a vendor identifier, and a first security answer at a server;
 applying a hash function to the first credentials information;
 applying a hash function to the first security answer;
 generating a first encryption key by using the vendor identifier, the hashed first credentials information, and a first string of randomized data;
 generating encrypted text using the hashed first security answer, the first encryption key, and a second string of randomized data;
 combining the first string of randomized data, the second string of randomized data, and the encrypted text to generate encrypted data; and
 sending the encrypted data to a user workstation associated with the vendor identifier.

16. The method of claim 15, further comprising authenticating the user by:
 receiving, at the user workstation coupled to the server, the encrypted data;
 decoupling the user workstation from the server;
 receiving second credentials information and a second security answer at the decoupled user workstation;
 applying a hash function to the second credentials information at the decoupled workstation;
 applying a hash function to the second security answer at the decoupled workstation;
 retrieving the first string of randomized data, the second string of randomized data, and the encrypted text from the encrypted data at the decoupled workstation;
 generating a second encryption key using the hashed second credentials information, the vendor identifier, and the first string of randomized data at the decoupled workstation;
 using the second encryption key and the second string of randomized data to decrypt the encrypted text and extract the hashed first security answer at the decoupled workstation;
 comparing the hashed second security answer with the hashed first security answer at the decoupled workstation; and
 authenticating the second credentials information if the hashed second security answer is the same as the hashed first security answer.

17. The method of claim 15, wherein the vendor identifier identifies one or more user workstations.

18. The method of claim 16, wherein the second credentials information comprises a username and a password.

19. The method of claim 18, wherein the username and password are rejected if the encrypted text cannot be decrypted using the second encryption key.

20. The method of claim 15, wherein the first encryption key is generated by applying a key derivation function on the vendor identifier, the hashed first credentials information, and the first string of randomized data.

* * * * *